United States Patent
Weaver

(10) Patent No.: US 9,589,678 B2
(45) Date of Patent: Mar. 7, 2017

(54) COMPLEX SHAPE STRUCTURE FOR LIQUID LITHIUM FIRST WALLS OF FUSION POWER REACTOR ENVIRONMENTS

(75) Inventor: Thomas Lyman Weaver, Webster Groves, MO (US)

(73) Assignee: THE BOEING COMPANY, Chicago, IL (US)

( * ) Notice: Subject to any disclaimer, the term of this patent is extended or adjusted under 35 U.S.C. 154(b) by 1108 days.

(21) Appl. No.: 13/078,729

(22) Filed: Apr. 1, 2011

(65) Prior Publication Data
US 2012/0250812 A1    Oct. 4, 2012

(51) Int. Cl.
*G21B 1/13*    (2006.01)

(52) U.S. Cl.
CPC .............. *G21B 1/13* (2013.01); *Y02E 30/128* (2013.01)

(58) Field of Classification Search
CPC ... Y02E 30/128; Y02E 30/526; Y02E 30/122; C04B 30/02; C04B 38/0038; C04B 14/323; G21B 1/13; G21B 1/057; G21B 1/01; G21C 17/017; G21C 19/02; G21C 19/207
USPC ........... 376/150, 146, 133, 361; 165/104.26; 428/665
See application file for complete search history.

(56) References Cited

U.S. PATENT DOCUMENTS 2,168,068 A * 8/1939 Loweke ............... D06F 17/00
68/12.14

3,037,921 A * 6/1962 Tuck ................ H05H 1/12
313/161

(Continued)

FOREIGN PATENT DOCUMENTS

JP    S58-207000 A    12/1983
JP    2003-130979    *    8/2003

(Continued)

OTHER PUBLICATIONS

Merola, ITER International Organization, ITER in Vessel Components: Blanket Divertor Technical Presentation, Nuclear Fusion Engineering Masters, Torino, Jan. 24, 2011.*

(Continued)

*Primary Examiner* — Sean P Burke
(74) *Attorney, Agent, or Firm* — Vista IP Law Group LLP; Cynthia A. Dixon

(57) ABSTRACT

A method, system, and apparatus are disclosed for a complex shape structure for liquid lithium first walls of fusion power reactor environments. In particular, the method involves installing at least one tile on the surface area of the internal walls of the reactor chamber. The tile(s) is manufactured from a high-temperature resistant, porous open-cell material. The method further involves flowing liquid lithium into the tile(s). Further, the method involves circulating the liquid lithium throughout the interior network of the tile(s) to allow for the liquid lithium to reach the external surface of the tile(s) that faces the interior of the reactor chamber. In addition, the method involves outputting the circulated liquid lithium from the tile(s). In one or more embodiments, the reactor chamber is employed in a fusion reactor. In some embodiments, the tile is manufactured from a ceramic material or a metallic foam.

13 Claims, 3 Drawing Sheets

(56) References Cited

U.S. PATENT DOCUMENTS

| | | | |
|---|---|---|---|
| 3,240,153 A * | 3/1966 | Schrader | F16H 41/28 |
| | | | 29/889.21 |
| 3,762,992 A | 10/1973 | Hedstrom | |
| 4,277,306 A * | 7/1981 | Ohkawa | G21B 1/057 |
| | | | 376/135 |
| 4,389,467 A * | 6/1983 | Singh et al. | 429/478 |
| 4,650,632 A * | 3/1987 | Kugel | G21B 1/057 |
| | | | 376/143 |
| 4,654,182 A * | 3/1987 | D'Aoust | G21B 1/13 |
| | | | 376/136 |
| 4,696,781 A * | 9/1987 | Bourque | G21B 1/13 |
| | | | 376/136 |
| 6,716,782 B2 | 4/2004 | Heng et al. | |
| 6,887,551 B2 * | 5/2005 | Hyde et al. | 428/99 |
| 7,055,781 B2 | 6/2006 | Behrens et al. | |
| 7,128,980 B2 | 10/2006 | Schedler et al. | |
| 2003/0047505 A1 * | 3/2003 | Grimes et al. | 210/483 |
| 2004/0033881 A1 | 2/2004 | Heng et al. | |
| 2004/0195296 A1 | 10/2004 | Schedler et al. | |
| 2010/0063344 A1 * | 3/2010 | Kotschenreuther | G21B 1/01 |
| | | | 588/311 |
| 2010/0119025 A1 * | 5/2010 | Kotschenreuther | G21B 1/01 |
| | | | 376/134 |
| 2010/0246740 A1 * | 9/2010 | Kotschenreuther | G21B 1/05 |
| | | | 376/146 |

FOREIGN PATENT DOCUMENTS

| | | | | |
|---|---|---|---|---|
| JP | 2003 130979 | * | 8/2003 | G21B 1/00 |
| JP | 2003-270372 A | | 9/2003 | |
| JP | 2009-175051 A | | 8/2009 | |

OTHER PUBLICATIONS

Merle, (ITER International Organization, ITER in Vessel Components: Blanket Divertor Technical Presentation, Nuclear Fusion Engineering Masters, Torino, Jan. 24, 2011).*

R Kaita, S. Jardin, C. Kessel, R. Majeski, J. Spaleta, R. Woolley, L Zakharov, B. Nelson, and M. Ulrickson, "Modeling of Spherical Torus Plasmas for Liquid Lithium Wall Experiments", IEEE 2002. "Current Drive Experiment—Upgrade", Princeton Plasma Physics Laboratory Newsletter, Posted Aug. 26, 2004.

S.I. Krasheninnikov, L.E. Zakharov, and G.V. Pereverzev, "On Lithium Wall and Performance of Magnetic Fusion Device".

S.V. Mirnov, E.A. Azizov, V.A. Evtikhin, V.B. Lazarev, I.E. Lyublinski, A.V. Vertkov, D. Yu Prokhorov, "Experiments with Lithium Limiter on T-11M Tokamak and Applications of the Lithium Capillary-Pore System in Future Fusion Reactor Devices", Plasma Physics and Controlled Fusion vol. 48, pp. 821-837, May 16, 2006.

International Search Report, PCT Application Ser. No. PCT/US2012/023517, Jul. 6, 2012.

Lyublinski, et al., "Main Results and Prospects of Lithium Capillary-Porous System Investigation as Tokamak Plasma Facing Material", IAEA, Oct. 6, 2008, pp. 1-6, XP002677847, http://www-pub.iaea.org/mtcd/meetings/fec2008/ft_p2-15.pdf, retrieved Jun. 14, 2012. p. 4, paragraph 1, figure 1.

Mirnov, et al., "Plasma-wall interactions and plasma behavior in fusion devices with liquid lithium plasma facing components", Journal of Nuclear Materials, Elsevier BV, NL, vol. 390-391, Jun. 15, 2009, pp. 876-885, XP026109992, ISSN: 0022-3115, DOI: 10.1016/J.JNUCMAT.2009.01.228, retrieved on Mar. 4, 2009, p. 877, paragraph 2—p. 878, paragraph 2.2.

R. Majeski, "Liquid Metal Walls, Lithium and Low Recycling Boundary Conditions in Tokamaks", Princeton Plasma Physics Laboratory, Jan. 2010, pp. 1-16, XP002677848, http://www.pppl.gov/pub_report/2010/PPPL-4480.pdf, retrieved on Jun. 14, 2012, p. 13, paragraph 2.

"SLIP—Study of Lithium Infusion in Porous Media", University of Illinois, Feb. 27, 2009, pp. 1-3, XP002677849, http://cpmi.illinois.edu/2009/02/27/slip-study-of-lithium-infusion-in-porous-media, retrieved on Jun. 14, 2012, p. 2, paragraph 1.

Majeski, Dick, LRX? (the Lithium RFP eXperiment??!!), PPPL Princeton Plasma Physics Laboratory, ReNeW Them V PPPL Mar. 16-20, 2009 (12 pages).

Office Action from Japanese Patent Office for Japanese Patent Application No. 2014-502565, Apr. 14, 2015.

EP Examination Report, Application No. 12 709 413.4—1551, Feb. 19, 2016.

Evtikhin, et al., "Lithium Divertor Concept and Results of Supporting Experiments", Plasma Physics and Controlled Fusion, IOP, Bristol, GB, vol. 44, No. 6, Jun. 1, 2002 (Jun. 1, 2002), pp. 955-977, ISSN: 0741-3335, DOI:10.1088/0741-3335/44/6/322—XP002753999.

* cited by examiner

COMPLEX SHAPE STRUCTURE FOR LIQUID LITHIUM FIRST WALLS OF FUSION POWER REACTOR ENVIRONMENTS

BACKGROUND

The present disclosure relates to complex shape structures. In particular, it relates to complex shape structures for liquid lithium (Li) first walls of fusion power reactor environments.

SUMMARY

The present disclosure relates to an apparatus, system, and method for a complex shape structure for liquid lithium first walls of fusion power reactor environments. In one or more embodiments, the disclosed method for maintaining liquid lithium on a surface area of internal walls of a reactor chamber involves installing at least one tile on the surface area of the internal walls of the reactor chamber. At least one tile is manufactured from a high-temperature resistant, porous open-cell material. The disclosed method further involves flowing liquid lithium into at least one tile. In addition, the method involves circulating the liquid lithium throughout an interior network of the tile(s) to allow for the liquid lithium to reach the external surface of the tile(s) that faces the interior of the reactor chamber. The method also involves outputting the circulated liquid lithium from the tile(s).

In one or more embodiments of the present disclosure, the reactor chamber is employed in a fusion reactor. The tile may be manufactured to be of various shapes including, but not limited to, irregular shapes and regular shapes. In addition, the tile may be manufactured from various high-temperature, porous materials including, but not limited to, various types of ceramic materials and metallic foams.

In at least one embodiment, at least one tile contains at least one open cell in the interior of the tile(s). Liquid lithium is circulated throughout the interior of the tile(s) via the open cell(s). In one or more embodiments, at least one tile has a constant porosity. In some embodiments, at least one tile has a varied porosity.

In one or more embodiments, at least one tile includes an input plenum, where liquid lithium is inputted into the tile(s) via the input plenum. In at least one embodiment, at least one tile includes an output plenum, where liquid lithium is outputted from the tile(s) via the output plenum. In some embodiments, the input plenum and/or the output plenum are each a hollow piece of metal. In one or more embodiments, the flow rate of the circulation of the liquid lithium within the interior network of at least one tile is varied over time. In addition, in some embodiments, the flow rate of the circulation of the liquid lithium differs from tile to tile.

In at least one embodiment, the system for maintaining liquid lithium on a surface area of internal walls of a reactor chamber includes at least one tile and a reactor chamber. In one or more embodiments, at least one tile is manufactured from a high-temperature resistant, porous open-cell material. In some embodiments, at least one tile is installed on the surface area of the internal walls of the reactor chamber. In at least one embodiment, at least one tile allows for liquid lithium to be flowed into the tile(s). In addition, the tile(s) further allows for the liquid lithium to be circulated throughout the interior network of the tile(s) to allow for the liquid lithium to reach the external surface of the tile(s) that faces the interior of the reactor chamber. Additionally, the tile(s) further allows for the circulated liquid lithium to be outputted from the tile(s).

In one or more embodiments, a tile for maintaining liquid lithium on a surface area of internal walls of a reactor chamber is disclosed. In at least one embodiment, the tile is manufactured from a high-temperature resistant, porous open-cell material. In some embodiments, the tile includes at least one open cell in an interior of the tile for circulating the liquid lithium within the interior of the tile.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

DESCRIPTION

Figure 1:
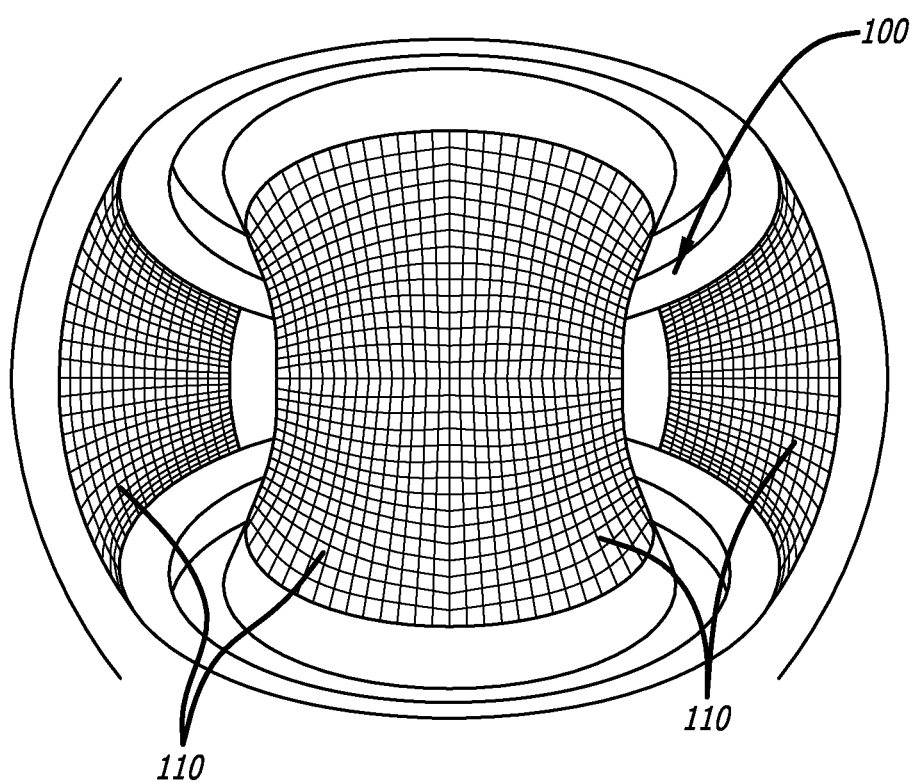
FIG. 1 is an illustration of the interior of a toroidal fusion power reactor, in accordance with at least one embodiment of the present disclosure.

The methods and apparatus disclosed herein provide an operative system for complex shape structures. Specifically, this system relates to complex shape structures for liquid lithium first walls of fusion power reactor environments. In particular, the disclosed system uses a high-temperature, high-porosity open-cell material to maintain liquid lithium in a fusion energy reactor, thereby reducing damage to the internal reactor surfaces that have complex shapes. For example, the Boeing Rigid Insulation (BRI) material, which is a porous open-cell ceramic material with a high temperature tolerance and a good material compatibility, may be employed by the disclosed system. In addition, the disclosed system also provides for high-neutron flux exposure for the lithium for purposes of tritium breeding.

BRI material is a porous, ceramic, fiber insulating material that comprises a unique combination of ceramic fibers, which are sintered together to form a low density, highly porous material with very low thermal conductivity. In addition, BRI material exhibits a high tensile strength and an outstanding dimensional stability. In particular, BRI material is manufactured from a combination of silica ($SiO_2$) and alumina ($Al_2O_3$) fibers, and boron-containing powders, which help to aid in the fusion and sintering of the silica and alumina fibers. The preponderance of the insulative capability of the BRI material is provided by the silica fiber and the alumina fiber orientation. The BRI material exhibits very low thermal conductivity, particularly in the through-the-thickness direction. Further details discussing the composition of BRI and the method of producing BRI are disclosed in U.S. Pat. No. 6,716,782, which is expressly incorporated herein by reference.

There are known difficulties in maintaining plasma control in fusion energy reactors. Among them, plasmas can be unstable at high power densities. Liquid lithium is known to help stabilize plasmas in reactor vessels. The plasma consists mostly of positive ions and negative electrons, and its outer sheath, near the reactor walls, is cooler than its core. In the sheath, the ions have a higher probability of acquiring electrons from the plasma and, thus, becoming neutral atoms than do ions in the core. Neutral atoms cannot be confined by magnetic fields, thus neutral atoms have a high probability of crossing the magnetic field that confines the plasma, and hitting the reactor vessel walls. In this process, the neutral atoms carry some energy from the plasma to the walls, thus causing a slight further cooling of the plasma sheath and a slight heating of the walls. In a fusion plasma, most of these neutral atoms are hydrogen, but other materials can be present, such as helium made by the fusion reactions and heavy elements (contaminants) that can be spalled off the reactor structure by accidental plasma impingement on the structure. If the walls are made of high temperature-tolerant ceramics or metals, the neutral atoms will stick to the walls for a short time, then drift back into the plasma sheath. However, the atoms reentering the plasma sheath from the walls are now quite cold in comparison to the plasma sheath, thus they cause considerable cooling of the plasma in the sheath. Normally, the plasma sheath is cooler than the plasma core, but if the sheath is cooled too much, the differential in temperature between the plasma core and the sheath increases the instability of the plasma. Lithium on the inside wall of the reactor tends to absorb and not release neutral atoms that drift into it. By absorbing and holding the neutral atoms that contact the walls, the lithium prevents the atoms from getting back into the plasma sheath as cold atoms, which helps the sheath to stay warmer and makes the overall plasma more stable.

Currently, in experiments, liquid lithium is drizzled down the inside of the side walls of the reactor vessel from channels that lie just above where the side walls are nearly vertical (i.e. the channels lie just above the "equator" or midsection of the torus reactor vessel). Because of gravity, the liquid lithium does not stay in place, but rather runs down the side walls of the vessel from the channels, and is collected by other channels and drains that lie farther down in the vessel that remove the lithium. This particular method is able to coat the side walls of the vessel from the equator of the reactor to most of the way down to its bottom because gravity causes the lithium to flow down from the channels to the bottom of the reactor. But, this method clearly is not able to coat the side walls that are above the equator of the vessel. In the lowest parts of reactors, liquid lithium has also been used in pools and on coarse horizontal screens, neither of which method can be effectively applied to the upper walls. The disclosed system allows for liquid lithium to be maintained on the surface of all the inner walls of the reactor vessel.

An additional advantage of the use of lithium on the reactor walls is that it is a low atomic number (low-Z) material. If high atomic number (high-Z) materials, such as iron from steel in reactor walls, enter into the plasma, their atoms can become electronically excited by absorbing kinetic energy from ions in the plasma. Typically, the excited high-Z materials lose their extra energy by radiating it as electromagnetic energy (photons). The plasma is transparent to most wavelengths of electromagnetic energy; thus, most photons emitted by excited high-Z materials escape from the plasma and are absorbed by the reactor walls. The net effect is an overall energy loss from the plasma and is called radiative cooling. The plasma gets colder and the reactor walls get hotter. That is the opposite of what is needed to maintain the fusion power reactions. Low-Z materials, such as lithium, have so few electrons that they have very few ways in which they can radiate energy, therefore, low-Z materials cause relatively little radiative cooling of the plasma.

A further advantage to the use of lithium on the insides of fusion reactor walls is that one of the two elements of reactor fuel, tritium, is very rare naturally, but can be made efficiently by exposing lithium to the flux of high energy neutrons produced by the fusion reactor. Thus, if lithium can be placed in regions of the reactor close to the plasma where the neutron flux is most intense, the production of tritium from the lithium can be efficient. Because of liquid lithium's tendency to hold on to atoms of other materials in it, cycling the lithium through the reactor provides an effective way to introduce pure lithium into the reactor, produce tritium in the lithium, and remove the tritium from the reactor by pumping the tritiated lithium back out of the reactor and passing it through a chemical processing system that extracts the tritium from the lithium, thus providing tritium to fuel the reactor and clean lithium ready to be cycled once more through the reactor.

The system of the present disclosure utilizes a porous, open-cell material that is capable of retaining liquid lithium in place on reactor vessel walls against gravity and electromagnetic forces. In addition, this material allows for the liquid lithium to be slowly pumped throughout the system in order to absorb contaminants from the plasma. During operation of the disclosed system, clean lithium is first pumped into the system to the inner surfaces of the reactor walls, where the lithium is exposed to the plasma. In that location, the clean lithium absorbs contaminants from the plasma. The contaminated lithium is then removed from the reactor, and is processed to remove the plasma contaminants from the lithium. After the contaminants are removed from the lithium, the cleaned lithium is re-circulated back into the system.

Liquid lithium surfaces exposed to the plasma inside experimental tokamaks and other types of fusion energy experimental devices have been shown to help stabilize the plasma and to help the plasma maintain its high internal temperature. However, it should be noted that these reactor vessels typically are constructed to have very complex shapes as well as having many discontinuities and openings for various items, such as for instruments, vacuum pumping ports, and magnetic coils. Currently, no effective methods have been proposed for retaining liquid lithium on the inside of the reactor vessel walls that accommodates all the discontinuities and openings, and which retains the lithium against the effects of gravity and electromagnetic forces. The present disclosure teaches a method which can accommodate discontinuities, and which keeps slowly flowing liquid lithium in place on reactor walls regardless of the orientation of the reactor wall surface, and the effects of gravity and electromagnetic forces.

To date, experiments with liquid lithium adjoining fusion plasmas have been more focused on the effect of lithium on the plasma than on how to build a liquid lithium wall. Therefore, four types of ad hoc approaches have been used to facilitate liquid lithium-hydrogen plasma interaction experiments. These four approaches are: (1) pools of liquid lithium placed in trays at the bottom of the toroidal reactor vessel, (2) metal screens wetted with liquid lithium that are placed horizontally at the bottom of the vessel, (3) a band placed about the mid-plane of the reactor vessel has liquid lithium flowing down its inner surface from the top of the band to the bottom of the band, and (4) confining the plasma in spherical and cylindrical reactor vessels that are physically rotated so as to cause the liquid lithium to continually recoat the inner surface walls of the vessel from a pool at the bottom of the vessel.

The first two listed approaches have limitations of only producing lithium surfaces for a small area in the bottom of the reactor. The third approach only coats a band about the middle of the reactor, and requires high flow rates to keep the surface of the band coated. High flow rates increases the pumping power required to operate the reactor, which subtracts from any energy the reactor might produce. The fourth approach is not being easily being employed by a toroidal vessel, which has the most effectively shaped magnetic fields for containing plasmas. Continually rotating the walls of a toroidal vessel is impossible because of the rigid materials used for the construction of these vessels. In addition, the fourth approach requires portions of the inside of the reactor vessel to constantly move, which interferes with the placement and the use of other devices that must be present within the vessel wall, such as vacuum pumping ports, sensors, and magnetic coils.

The present disclosure employs tiles manufactured from high-temperature, open-cell sponge-like material (e.g., the Boeing Rigid Insulation (BRI) material) to retain liquid lithium in place against gravity and electromagnetic forces, and to allow for the liquid lithium to be slowly pumped throughout the system in order to remove contaminants from the plasma. There are multiple advantages to this approach. A first advantage is that the tiles can be manufactured to be small in size so that the inside of the toroidal vessel can be tiled with a mosaic of liquid lithium filled tiles despite the complex shape of the inside of the reactor vessel. A second advantage is that the material of the tiles (e.g., a porous ceramic material with open cells) is resistant to the high temperatures to which the tiles will be exposed to when the plasma is present inside of the reactor vessel. A third advantage is that the material of the tiles (e.g., porous a ceramic material with open cells) is resistant to the corrosive effects of lithium. A fourth advantage is that the construction of the tiles can be tailored to produce pore sizes and/or open channels that are optimal to the retention and flow of liquid lithium.

In addition, a fifth advantage is that, if plasma disruptions cause the plasma to impact the tiles so intensely that the outer surface of lithium boils away, the high permeability of the tiles will allow more lithium to wick to the surface of the tile. A sixth advantage is that, in the event that some of the tile itself is removed by a plasma impact, the depth of the tile will allow for the tile to continue to function and, thus, several plasma impacts on a tile can be tolerated before the tile would need to be replaced. A seventh advantage is that, in the event that part of a tile is ablated by the plasma, the materials that the tile is manufactured from are mostly of low nuclear weight elements, which will have a less adverse effect on the plasma than materials of high weight metals. An eighth advantage is that, in the event that a portion of a tile is ablated, the portion of the tile that is ablated will simply be an empty space filled with liquid lithium. As such, it is evident that the use by the disclosed system of tiles, which are manufactured from a high-temperature, porous material, to retain liquid lithium on the reactor vessel walls has many beneficial advantages.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

FIG. 1 is an illustration of the interior of a fusion power reactor 100, in accordance with at least one embodiment of the present disclosure. In this figure, it can be seen that the fusion power reactor 100 is of a torus shape. It should be noted that the system of the present disclosure can be used with various different types and shapes of fusion power reactors. The first wall of the fusion power reactor 100 is lined with small tiles 110 that are each manufactured from a high temperature-tolerant, porous material. These small tiles 110 allow for liquid lithium to coat the surface of the walls of the reactor vessel 100. The liquid lithium helps to stabilize the plasma in the reactor vessel 100, and helps the plasma maintain its high internal temperature.

Figure 2:
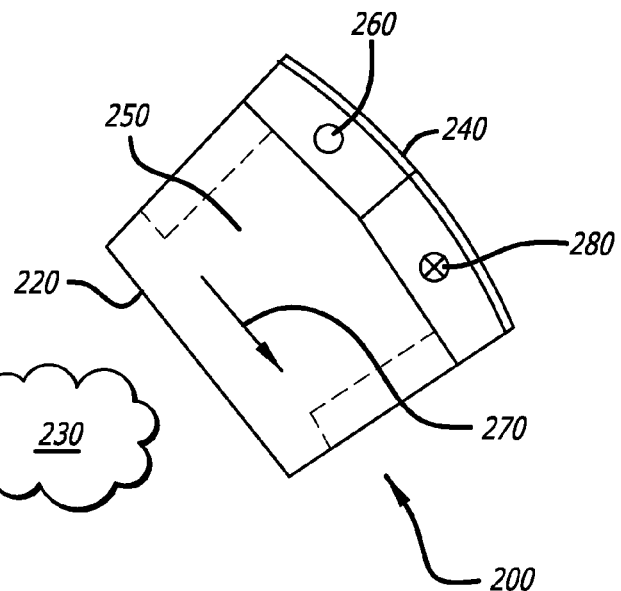
FIG. 2 shows a top view of a single tile for maintaining liquid lithium on the surface area of the internal walls of a reactor chamber, in accordance with at least one embodiment of the present disclosure.

FIG. 2 shows a top view of a single tile 200 for maintaining liquid lithium on the surface area of the internal walls of a reactor chamber, in accordance with at least one embodiment of the present disclosure. The tile 200, which is manufactured from a high-temperature-resistant, porous material with open cells, is installed onto the reactor vessel wall 240. In this figure, the tile 200 is shown to include an input plenum 260 and an output plenum 280. Both the input plenum 260 and the output plenum 280 are a single hollow piece of non-porous material (e.g., a metal).

During operation of the system, clean liquid lithium is inputted into the tile 200 through the input plenum 260. The liquid lithium is flowed into the input plenum 260 of the tile 200 via pressure being applied at the input plenum 260 and/or a vacuum being present at the output plenum 280. Various types of pumps may be employed by the system for applying pressure at the input plenum 260 of the tile 200 including, but not limited to, a propeller pump, a centrifugal pump, and a piston pump. The clean liquid lithium circulates within the interior network of open cells or channels throughout the body 250 of the tile 200. The clean liquid lithium seeps through the open cells of tile 200 to reach the porous external surface 220 of the tile 200 that faces the interior cavity of the reactor vessel, which contains the hot, tenuous plasma 230. The direction of the flow of the liquid lithium within the body 250 of the tile 200 is denoted by arrow 270.

The clean liquid lithium that lies on the porous external surface 220 of the tile 200 absorbs contaminants from the plasma 230. This newly contaminated liquid lithium is then removed from the tile 200 via the output plenum 280. After the contaminated liquid lithium is removed from the tile 200, the liquid lithium is processed to remove the contaminants from the liquid lithium. The resulting cleaned liquid lithium is then re-circulated back into the system.

It should be noted that in alternative embodiments, the tile 200 may not specifically include an input plenum 260 and/or an output plenum 280 as is depicted in FIG. 2, but rather may have at least one open cell or channel in its interior for the liquid lithium to be inputted into the tile 200 and/or to be outputted from the tile 200.

Figure 3:
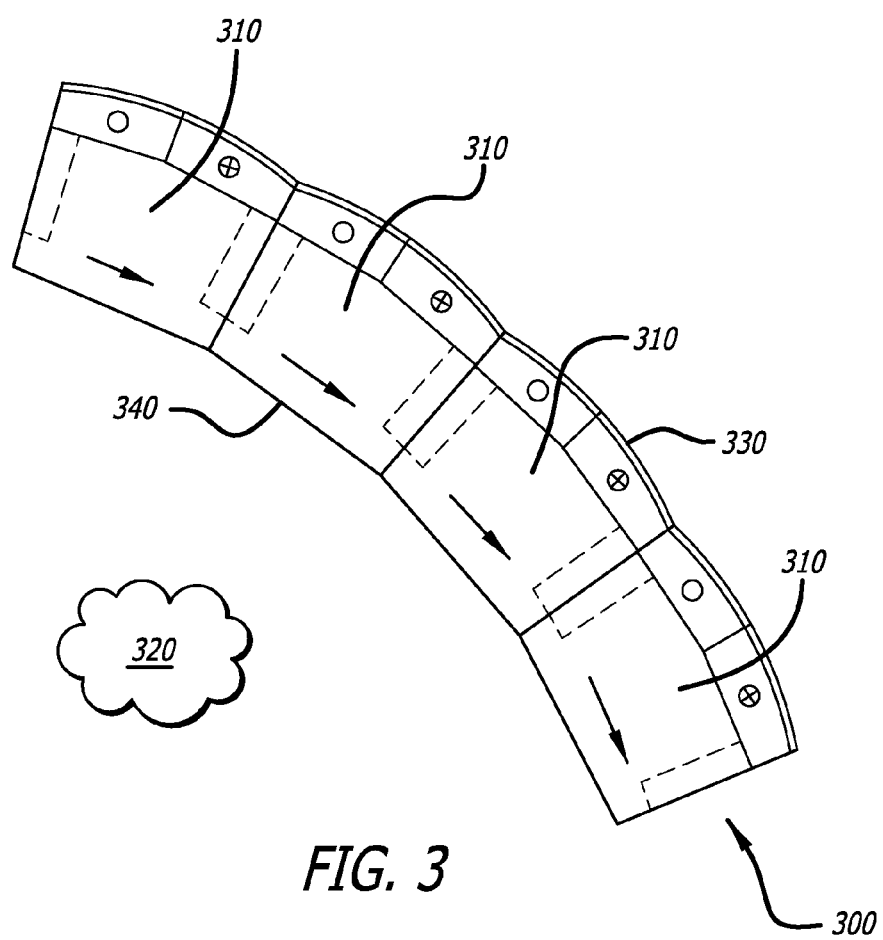
FIG. 3 illustrates a top view of a configuration of four of the tiles of FIG. 2 that are installed next to one another, in accordance with at least one embodiment of the present disclosure.

FIG. 3 illustrates a top view of a configuration 300 of four of the tiles 310 of FIG. 2 that are installed next to one another, in accordance with at least one embodiment of the present disclosure. In this figure, it is shown that the tiles 310 are able to be installed adjacent to one another along the curved surface of the reactor vessel wall 330. When the tiles 310 are installed in this configuration, the porous external surface 340 of the tiles 310 that faces the interior cavity of the reactor vessel containing the plasma 320 is shown to form a curved surface area.

Figure 4:
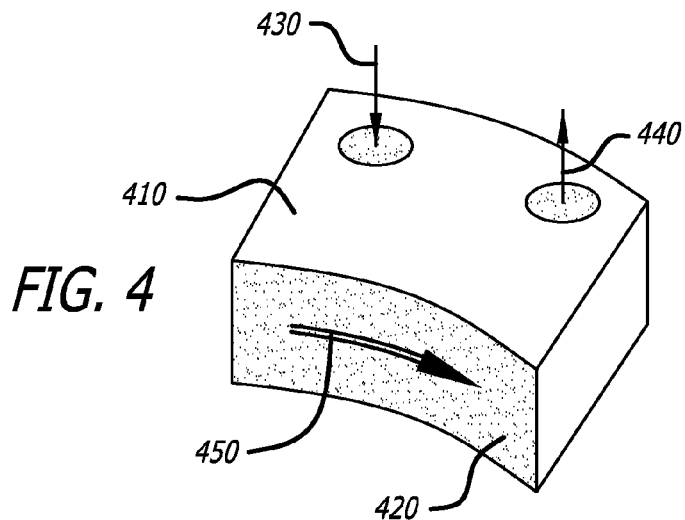
FIG. 4 depicts a cross-sectional side view of a tile for maintaining liquid lithium on the surface area of the internal walls of a reactor chamber that has a uniform porosity, in accordance with at least one embodiment of the present disclosure.

FIG. 4 depicts a cross-sectional side view of a tile 410 for maintaining liquid lithium on the surface area of the internal walls of a reactor chamber that has a uniform porosity, in accordance with at least one embodiment of the present disclosure. In this figure, the tile 410 is shown to have an input plenum 430 and an output plenum 440. The tile 410 is also depicted to be manufactured to have a uniform porosity 420. In addition, the direction of the flow of the liquid lithium within the body of the tile 410 is denoted by arrow 450 in this figure.

Figure 5:
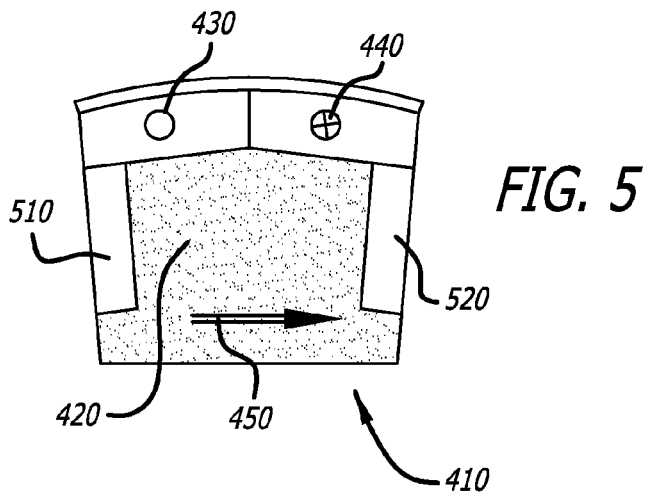
FIG. 5 illustrates a cross-sectional top view of the tile of FIG. 4, in accordance with at least one embodiment of the present disclosure.

FIG. 5 illustrates a cross-sectional top view of the tile 410 of FIG. 4, in accordance with at least one embodiment of the present disclosure. This figure simply shows another cross-sectional view of the tile 410, which has a uniform porosity 420. In addition, it should be noted that, in some embodiments, the side areas 510, 520 of the tile 410 are manufactured from the same non-porous material that is used to manufacture the input plenum 430 and the output plenum 440.

Figure 6:
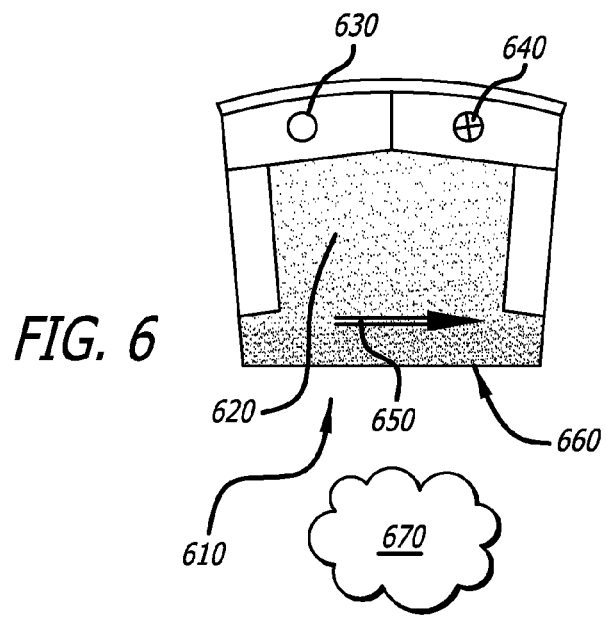
FIG. 6 shows a cross-sectional top view of a tile for maintaining liquid lithium on the surface area of the internal walls of a reactor chamber that has a non-uniform porosity, in accordance with at least one embodiment of the present disclosure.

FIG. 6 shows a cross-sectional top view of a tile 610 for maintaining liquid lithium on the surface area of the internal walls of a reactor chamber that has a non-uniform porosity, in accordance with at least one embodiment of the present disclosure. In this figure, the tile 610 is shown to have an input plenum 630 and an output plenum 640. The tile 610 is illustrated to be manufactured to have a non-uniform porosity 620. In this figure, the porosity of the body of the tile 610 is shown to gradually lessen from the external surface 660 of the tile 610 that faces the plasma 670 to the input and output plenums 630, 640. Also in this figure, arrow 650 illustrates the direction of the flow of the liquid lithium within the body of the tile 610.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A method for maintaining liquid lithium on a surface area of internal walls of a reactor chamber, the method comprising:
   installing at least one tile on the surface area of the internal walls of the reactor chamber, wherein the at least one tile is manufactured from a high-temperature resistant, porous open-cell material comprising an internal network;
   pumping the liquid lithium through the interior network of the at least one tile;
   circulating the liquid lithium throughout the interior network of the at least one tile via at least one open cell to allow for the liquid lithium to seep from the interior network through the porous open-cell material to reach an external surface of the at least one tile that faces the interior of the reactor chamber, wherein the porous open-cell material retains the liquid lithium in place on the internal walls of the reactor chamber against gravity and electromagnetic forces; and
   outputting the circulated liquid lithium from the at least one tile.

2. The method of claim 1, wherein the reactor chamber is employed in a fusion reactor.

3. The method of claim 1, wherein the at least one tile has an irregular shape.

4. The method of claim 1, wherein the at least one tile has a regular shape.

5. The method of claim 1, wherein the high-temperature resistant, porous material is a ceramic material.

6. The method of claim 1, wherein the high-temperature resistant, porous material is a metallic foam.

7. The method of claim 1, wherein the at least one tile has a constant porosity.

8. The method of claim 1, wherein the at least one tile has a varied porosity.

9. The method of claim 1, wherein the at least one tile includes an input plenum,
   wherein the liquid lithium is inputted into the at least one tile via the input plenum.

10. The method of claim 9, wherein the input plenum is a hollow piece of metal.

11. The method of claim 1, wherein the at least one tile includes an output plenum,
   wherein the liquid lithium is outputted from the at least one tile via the output plenum.

12. The method of claim 11, wherein the output plenum is a hollow piece of metal.

13. The method of claim 1, wherein a flow rate of the circulation of the liquid lithium within the interior network of the at least one tile is varied over time.

* * * * *